United States Patent
Zhang

(10) Patent No.: US 11,477,311 B2
(45) Date of Patent: Oct. 18, 2022

(54) ELECTRONIC DEVICE AND FABRICATION METHOD THEREOF

(71) Applicant: GUANGDONG OPPO MOBILE TELECOMMUNICATIONS CORP., LTD., Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/895,708

(22) Filed: Jun. 8, 2020

(65) Prior Publication Data

US 2020/0304617 A1  Sep. 24, 2020

Related U.S. Application Data

(63) Continuation of application No. PCT/CN2019/075732, filed on Feb. 21, 2019.

(30) Foreign Application Priority Data

Mar. 9, 2018 (CN) .......................... 201810193196.9

(51) Int. Cl.
*H04M 1/02* (2006.01)
*G06F 3/042* (2006.01)

(52) U.S. Cl.
CPC .......... *H04M 1/0266* (2013.01); *G06F 3/042* (2013.01); *H04M 2250/12* (2013.01)

(58) Field of Classification Search
CPC ..... G06F 3/042; H04M 1/026; H04M 1/0266; H04M 1/22; H04M 1/72454; H04M 1/72484; H04M 1/73; H04M 2250/12
See application file for complete search history.

(56) References Cited

U.S. PATENT DOCUMENTS

2009/0153288 A1  6/2009  Hope et al.
2012/0129580 A1  5/2012  Tam
(Continued)

FOREIGN PATENT DOCUMENTS

CN  202383599 U  8/2012
CN  104536179 A  4/2015
(Continued)

OTHER PUBLICATIONS

English translation of OA for CN application 201810193196.9 dated Aug. 28, 2019.
(Continued)

*Primary Examiner* — Nelson M Rosario
(74) *Attorney, Agent, or Firm* — Young Basile Hanlon & MacFarlane, P.C.

(57) ABSTRACT

An electronic device, comprising a display screen, an infrared sensor and a light blocking element, wherein the display screen comprises a display area and a non-display area. The infrared sensor comprises a transmitter and a receiver. The transmitter is located below the non-display area. The transmitter is used to emit infrared light. The receiver is used to receive the infrared light. The light blocking element is arranged between the transmitter and the display area, and the light blocking element is used to block the infrared light emitted by the transmitter from entering into the display area.

1 Claim, 10 Drawing Sheets

(56) References Cited

U.S. PATENT DOCUMENTS

| | | | |
|---|---|---|---|
| 2012/0170284 A1* | 7/2012 | Shedletsky | G01J 1/0407 362/355 |
| 2016/0139702 A1 | 5/2016 | Franklin et al. | |
| 2016/0307542 A1 | 10/2016 | Zheng et al. | |
| 2018/0005005 A1* | 1/2018 | He | G06F 3/0418 |
| 2018/0199124 A1* | 7/2018 | Hecht | G06F 3/0412 |

FOREIGN PATENT DOCUMENTS

| | | |
|---|---|---|
| CN | 105554196 A | 5/2016 |
| CN | 106385475 A | 2/2017 |
| CN | 106850898 A | 6/2017 |
| CN | 106933415 A | 7/2017 |
| CN | 206341251 U | 7/2017 |
| CN | 206442424 U | 8/2017 |
| CN | 107135290 A | 9/2017 |
| CN | 206460737 U | 9/2017 |
| CN | 107332948 A | 11/2017 |
| CN | 107608454 A | 1/2018 |
| CN | 107767835 A | 3/2018 |
| CN | 108600421 A | 9/2018 |
| WO | 2013114834 A1 | 8/2013 |

OTHER PUBLICATIONS

English translation of OA for CN application 201810193196.9 dated Nov. 29, 2019.
English translation of OA for CN application 201810193196.9 dated Mar. 30, 2020.
English translation of ISR for PCT application PCT/CN2019/075732 dated Apr. 29, 2019.
English translation of Notice of Allowance for CN application 201810193196.9 dated Jun. 11, 2020.
Extended European Search Report for EP Application 19764106.1 dated Mar. 17, 2021.
Indian Examination Report for IN Application 202017032648 dated Aug. 3, 2021. (6 pages).
Communication pursuant to Article 94(3) EPC for EP Application 19764106.1 dated Mar. 18, 2022. (7 pages).

* cited by examiner

ELECTRONIC DEVICE AND FABRICATION METHOD THEREOF

CROSS-REFERENCE TO RELATED APPLICATION(S)

This application claims priority to and benefits of Chinese Patent Application Serial No. 201810193196.9, filed on Mar. 9, 2018, the entire content of which is incorporated herein by reference.

TECHNICAL FIELD

The present disclosure relates to the field of electronic technology, and more particularly to an electronic device and a production method thereof.

BACKGROUND

Generally, an electronic device like a mobile phone includes elements such as a display screen and an infrared sensor, in which the infrared sensor may be used to detect a distance between an object outside the display screen and the display screen. With the development of mobile phones and the demands of users, full screen mobile phones have become the development trend of mobile phones, but the positions of sensors such as infrared sensors make the screen-to-body ratio of the mobile phone relatively small. Therefore, how to allocate the position of each sensor on the full screen has become an urgent problem to be solved.

SUMMARY

Embodiments of the present disclosure provide an electronic device and a production method thereof.

The electronic device according to embodiments of the present disclosure includes a display screen including a display region and a non-display region; an infrared sensor, including a transmitter, located below the non-display region and configured to emit infrared light; and a receiver, configured to receive the infrared light; and a light blocking element, disposed between the transmitter and the display region and configured to prevent the infrared light emitted by the transmitter from entering the display region.

The electronic device according to embodiments of the present disclosure includes a display screen, including a display region and a non-display region; an infrared sensor, including a transmitter, located at a side corresponding to the non-display region and configured to emit infrared light; and a receiver, configured to receive the infrared light; and a light blocking element, disposed between the transmitter and the display region, and configured to prevent the infrared light emitted by the transmitter from entering the display region.

The method for producing an electronic device according to embodiments of the present disclosure includes: providing a display screen including a display region and a non-display region; providing below the display screen an infrared sensor which includes a transmitter and a receiver, so that the transmitter is located below the non-display region, the transmitter being configured to emit infrared light and the receiver being configured to receive the infrared light; and providing a light blocking element between the transmitter and the display region, the light blocking element being configured to prevent the infrared light emitted by the transmitter from entering the display region.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and/or other aspects and advantages of embodiments of the present disclosure will become apparent and more readily appreciated from the following descriptions made with reference to the drawings, in which.

Figure 1:
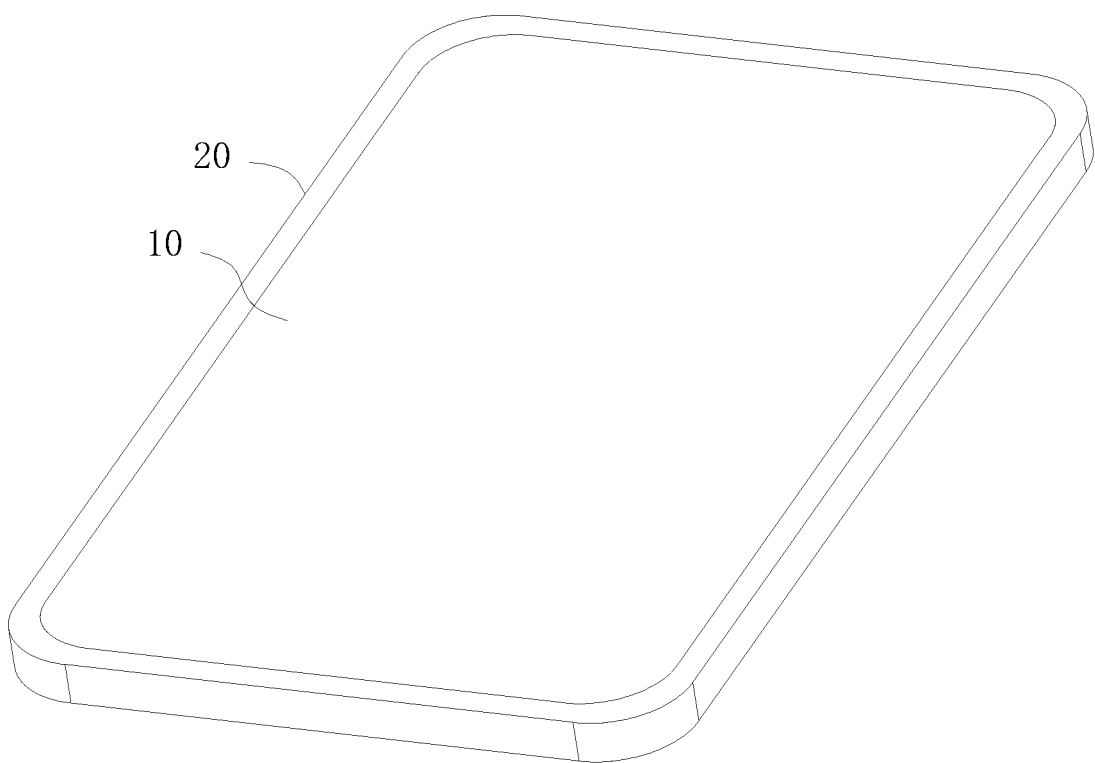
FIG. 1 is a schematic perspective view of an electronic device according to an embodiment of the present disclosure.

REFERENCE NUMERALS electronic device 10, coverplate 11, touch layer 12, display screen 13, upper surface 131, lower surface 132, display region 1311, non-display region 1312, first coating layer 14, second coating layer 15, infrared sensor 16, transmitter 161, receiver 162, package body 163, buffer layer 18, metal sheet 19, shell 20, light blocking element 30, battery 110, main circuit board 120.

DETAILED DESCRIPTION

Embodiments of the present disclosure will be described in detail below, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure, and shall not be construed to limit the present disclosure.

In the present disclosure, unless expressly specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications or interactions of two elements, which can be understood by those skilled in the art according to specific situations.

In the present disclosure, a structure in which a first feature is "on" a second feature may include an embodiment in which the first feature is in direct contact with the second feature, and may also include an embodiment in which the first feature and the second feature are not in direct contact with each other, but are contacted via an additional feature formed therebetween.

Electronic devices, such as mobile phones or tablet computers, generally detect a distance between the electronic device and a user by installing an infrared sensor. Take a mobile phone as an example, an infrared sensor is provided at an upper region of the mobile phone. When the user carries out a voice call or related operations, the mobile phone is close to the head, the infrared sensor feeds distance information back to a processor, and the processor executes a corresponding instruction, such as turning off lights of a display screen assembly. In the related art, providing the infrared sensor for the electronic device needs to form a corresponding hole in a shell for transmitting and receiving infrared light signals. While with the development of electronic devices, people have increasingly high requirements on the appearance and operation experience of mobile phones, and mobile phones have developed towards a full screen. However, for a full screen mobile phone, an ultra-narrow bezel is formed between the shell and the display screen assembly, which is too narrow to provide enough space for forming the hole, and even if the hole is formed, the overall strength of the bezel will be reduced, and the reliability of the electronic device will be lowered.

Figure 2:
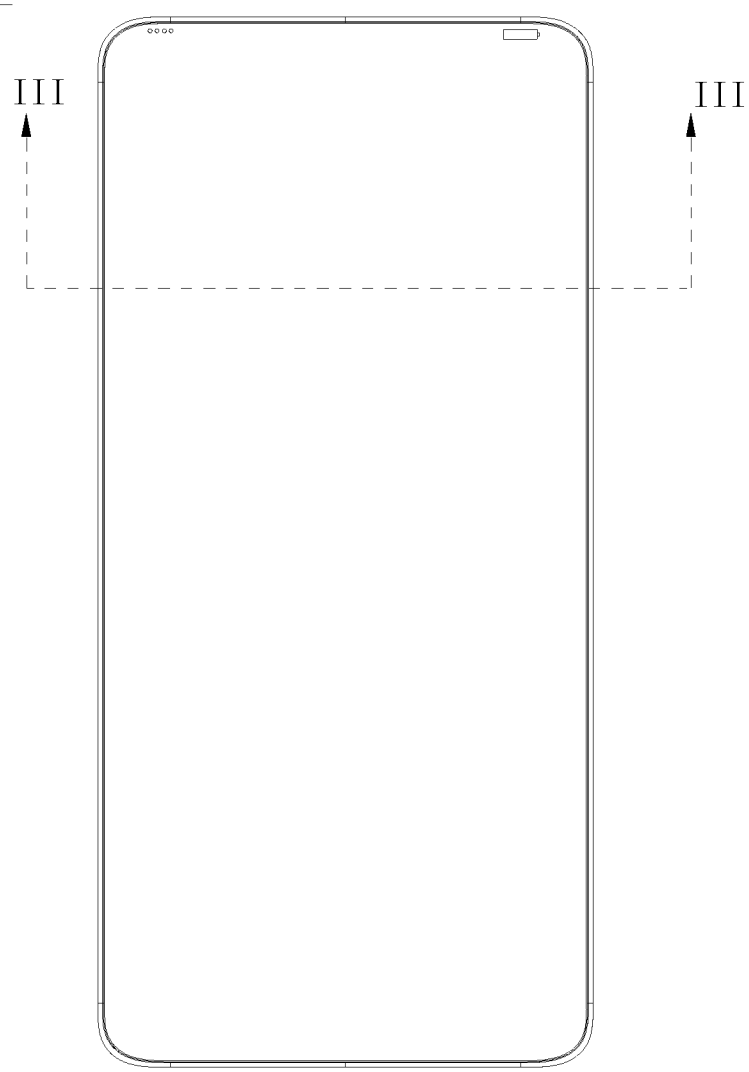
FIG. 2 is a schematic plan view of an electronic device according to an embodiment of the present disclosure.

As illustrated in FIG. 1 and FIG. 2, an electronic device 10 according to embodiments of the present disclosure includes an electronic device 10 and a shell 20. The electronic device 10 may be a mobile phone or a tablet computer, etc. The electronic device 10 according to embodiments of the present disclosure will be illustrated as a mobile phone as example, but the electronic device 10 may be in other specific forms, which are not limited herein.

Figure 3:
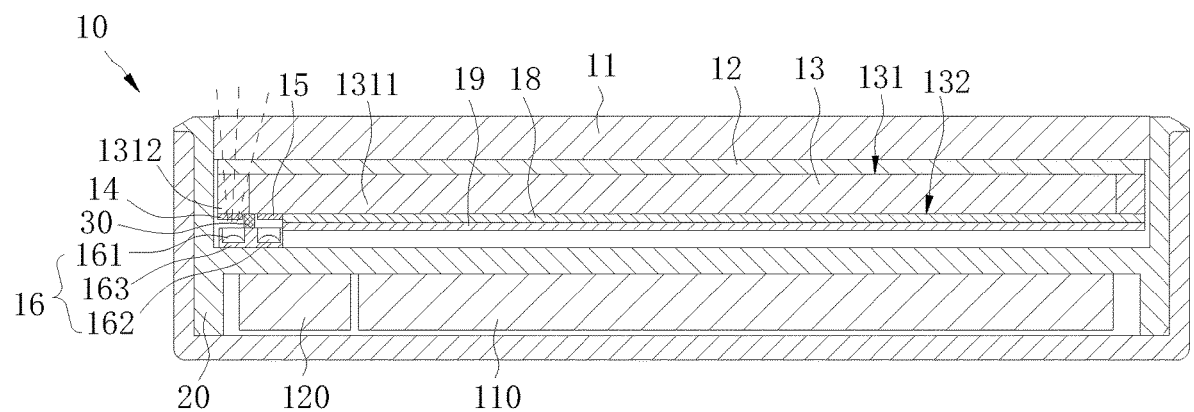
FIG. 3 is a schematic sectional view of the electronic device along an direction as shown in FIG. 2.

As illustrated in FIG. 3, the electronic device 10 includes a display screen 13, an infrared sensor 16 and a light blocking element 30. The display screen 13 includes a display region 1311 and a non-display region 1312, and the non-display region 1312 surrounds the display region 1311. The infrared sensor 16 is located below the display screen 13 and includes a transmitter 161 and a receiver 162. Further, the transmitter 161 is located below the non-display region 1312. In other words, the transmitter 161 is located at a side corresponding to the non-display region 1312.

The transmitter 161 is configured to emit infrared light. For example, the transmitter 161 is configured to emit the infrared light through the non-display region 1312. The receiver 162 is configured to receive the infrared light. For example, the receiver 162 is configured to receive the infrared light through the display region 1311. The light blocking element 30 is disposed between the transmitter 161 and the display region 1311 and configured to prevent the infrared light emitted by the transmitter 161 from entering the display region 1311.

It will be understood that, the display screen 13 includes an upper surface 131 and a lower surface 132, and the display screen 13 is configured to luminesce and display contents through the upper surface 131. The display screen 13 is light transmissive, so that the infrared light emitted by the transmitter 161 can pass through the display screen 13. Similarly, the reflected infrared light may be received by the receiver 162 through the display screen 13.

The transmitter 161 is configured to emit the infrared light, when the infrared light emitted by the transmitter 161 meets an obstacle in a detection direction, a part of the infrared light will be reflected back and received by the receiver 162. By calculating the time of the infrared light from emission to reflection back, a processor is able to determine a distance between electronic device 10 and the obstacle and make a corresponding adjustment. In an example, when the user is receiving or making a call, the electronic device 10 is close to the head, the transmitter 161 emits the infrared light, and the receiver 162 receives the infrared light reflected by the head. After calculating the time of the infrared light from emission to reflection back, the processor issues a corresponding instruction to control the screen to turn off background lights. When the electronic device 10 is away from the head, the processor calculates feedback data again and issues an instruction to turn on the background lights of the screen. In this way, not only a misoperation of the user is prevented, but also the power of the mobile phone is saved.

Since the transmitter 161 has a certain emission angle, even if the transmitter 161 is located outside the display region 1311, it cannot guarantee that the infrared light emitted by the transmitter 161 does not enter the display region 1311. For this, the light blocking element 30 is provided to prevent the infrared light emitted by the transmitter 161 from entering the display region 1311, so as to avoid adverse influences of the infrared light on a photoelectric element in the display region 1311. In an example, the light blocking element 30 is foam. Of course, the light blocking element 30 may be other non-light-transmissive materials, such as plastics.

In the electronic device 10, the receiver 162, as an input element of the electronic device 10, may receive an infrared signal and input the signal into the electronic device 10. The display screen 13, as an output element of the electronic device 10, may output displayed contents to the outside of the display screen 13 for the user to obtain corresponding information.

The shell 20 is configured to accommodate the electronic device 10, so as to protect the electronic device 10. The electronic device 10 is disposed in and surrounded by the shell 20, so that direct damage to internal elements of the electronic device 10 by external factors is avoided. The shell 20 may be formed by machining an aluminum alloy with a CNC machine tool or may be injection molded using polycarbonate (PC) or PC+acrylonitrile butadiene styrene (ABS) materials.

In summary, in the electronic device 10 according to embodiments of the present disclosure, the infrared sensor 16 is disposed below the display screen 13 to ensure that the electronic device 10 achieves a full-screen effect. In addition, an orthographic projection of the transmitter 161 of the infrared sensor 16 on the lower surface 132 of the display screen 13 is located outside the display region 1311, and the light blocking element 30 prevents the infrared light from entering the display region 1311, so that the influence of the infrared light emitted by the transmitter 161 on the working stability of a thin film transistor (TFT) of the display region 1311 may be avoided, and the display screen 13 and the infrared sensor 16 may realize their respective functions without interfering with each other.

Specifically, the electronic device 10 further includes a battery 110 and a main circuit board 120. The battery 110 and the main circuit board 120 are disposed at the same side of the shell 20, while the battery 110 and the display screen 13 are disposed at two opposite sides of the shell 20, respectively. The battery 110 is configured to provide electric energy for the electronic device 10, and the main circuit board 120 is configured to control a working state of the electronic device 10, for example, the main circuit board 120 controls the display screen 13 to play a video content.

In some embodiments, the display screen 13 includes an organic light-emitting diode (OLED) display screen.

Specifically, the OLED display screen has good light transmittance and is able to transmit visible light and infrared light. Therefore, the OLED display screen does not affect the infrared sensor to emit and receive the infrared light when displaying contents. The display screen 13 may apply a micro LED display screen, which also has good light transmittances to the visible light and the infrared light. It should be understood that, these display screens are only illustrated as examples, and embodiments of the present disclosure are not limited thereto.

Figure 4:
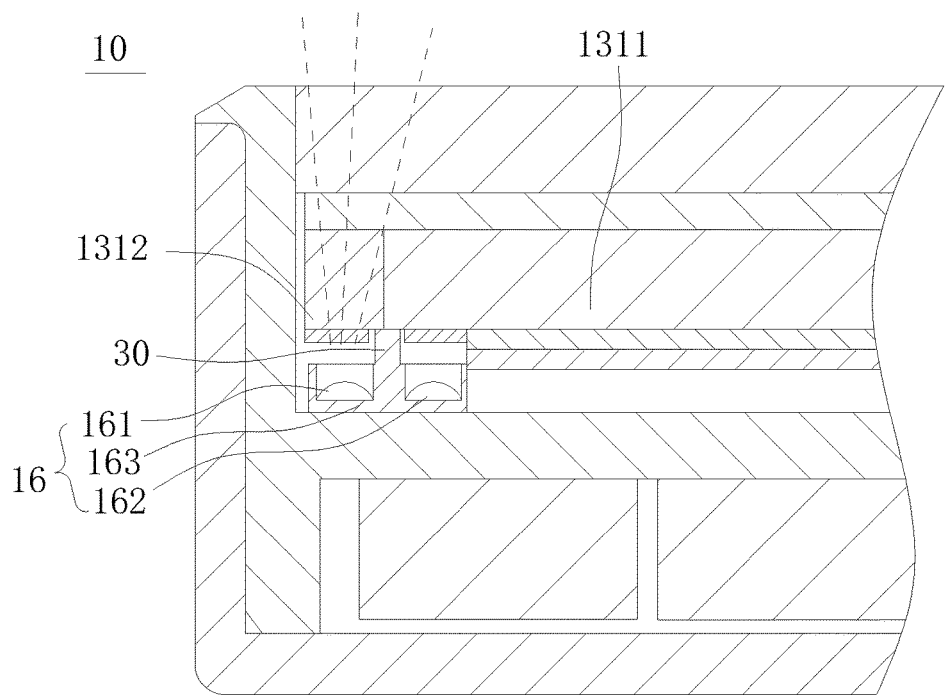
FIG. 4 is a schematic partial sectional view of an electronic device according to an embodiment of the present disclosure.

As illustrated in FIG. 4, in some embodiments, the light blocking element 30 is adhesively fixed at a connection between the display region 1311 and the non-display region 1312. In this way, the fixing manner of the light blocking element 30 is easy to realize, thereby making the electronic device 10 easy to manufacture. In an example, when fixing the light blocking element 30 to the lower surface 132 of the display screen 13, a double-sided adhesive tape may be adhered on a surface of the light blocking element 30, and then the light blocking element 30 may be adhesively fixed at the connection between the display region 1311 and the non-display region 1312 through the double-sided adhesive tape.

As illustrated in FIG. 3, in some embodiments, the infrared sensor 16 includes a package body 163 encapsulating the transmitter 161 and the receiver 162, the light blocking element 30 is fixed to the package body 163 and located between the transmitter 161 and the receiver 162. In this way, the installation of the light blocking element 30 is stable, and it is convenient for the infrared sensor 16 and the light blocking element 30 to cooperate with the display screen 13 as a whole.

In some embodiments, the light blocking element 30 is made of a soft material, and the light blocking element 30 abuts against the lower surface 132 of the display screen 13. In this way, the light blocking element 30 has a better light blocking effect, ensuring that the infrared light emitted by the transmitter 161 cannot enter the display region 1311. In addition, such a configuration makes the cooperation of the infrared sensor 16 with the display screen 13 more compact.

Figure 5:
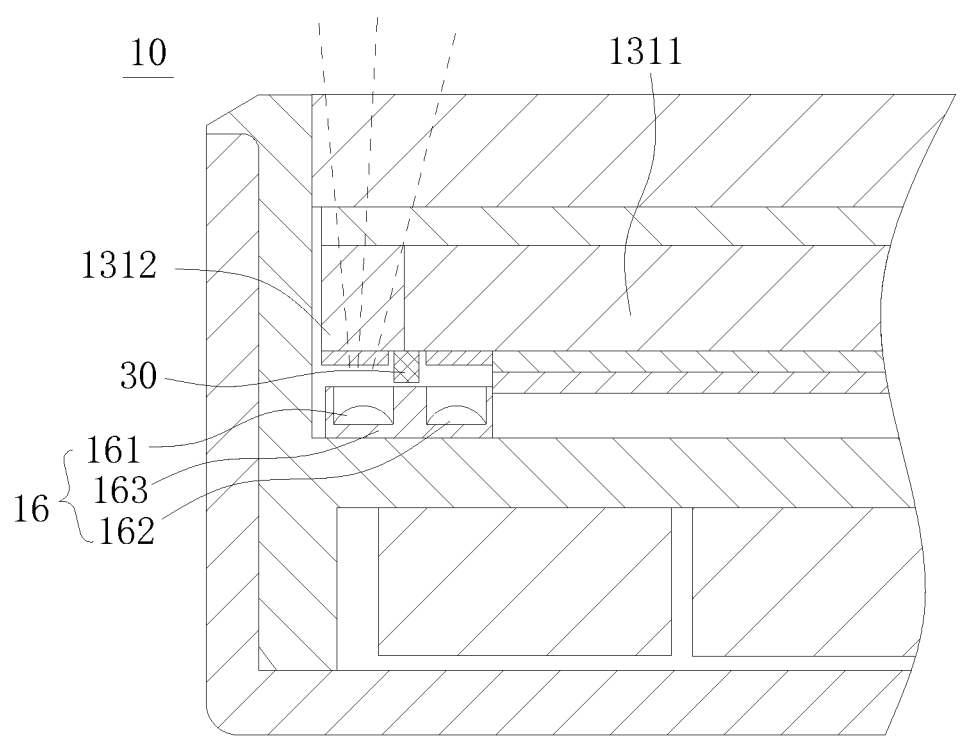
FIG. 5 is a schematic partial sectional view of an electronic device according to another embodiment of the present disclosure.

As illustrated in FIG. 5, in some embodiments, the light blocking element 30 is integral with the package body 163. In this way, the material of the light blocking element 30 is the same as that of the package body 163, and the light blocking element 30 may be formed at the same time when the infrared sensor 16 is manufactured, which may reduce the number of parts of the electronic device 10 and improve the assembly efficiency of the electronic device 10.

Figure 6:
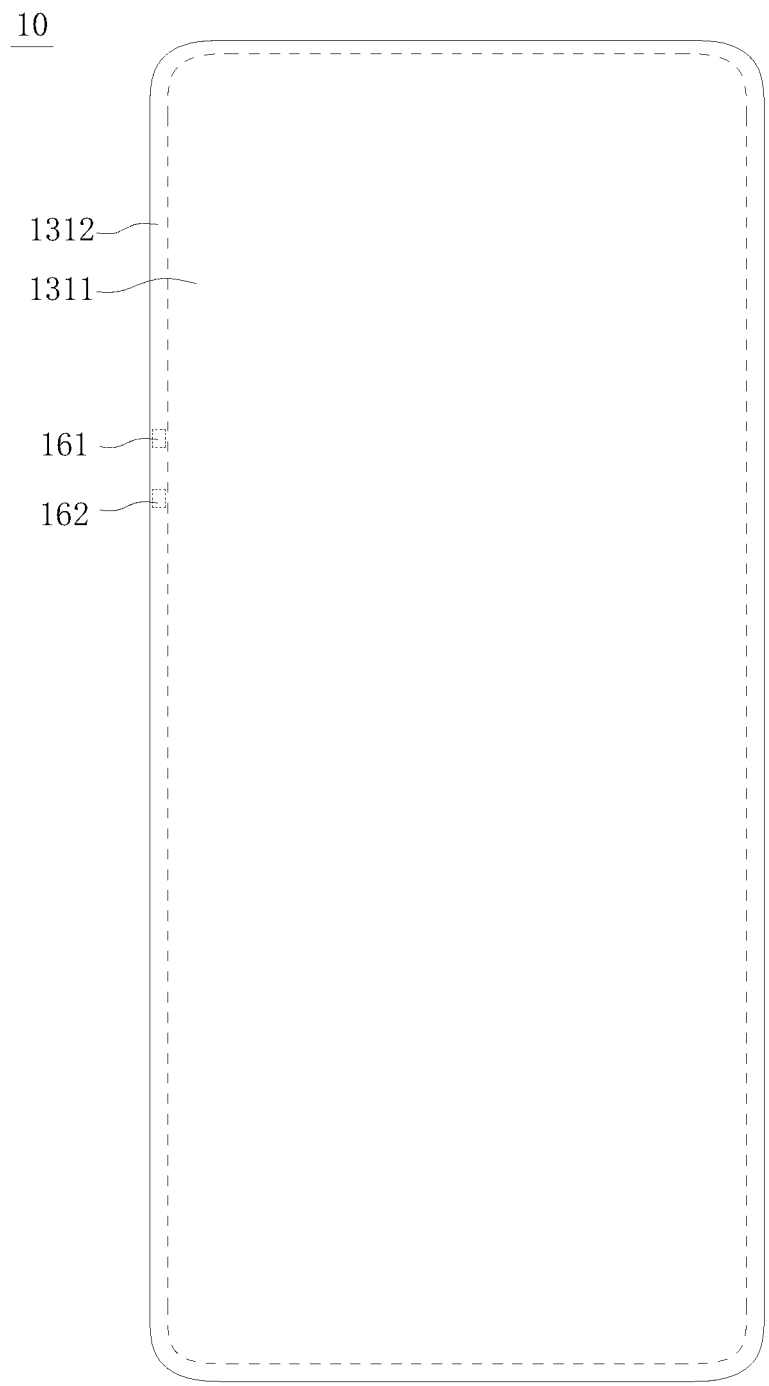
FIG. 6 is a schematic plan view of an electronic device according to an embodiment of the present disclosure.

In some embodiments, an orthographic projection of the receiver 162 on the lower surface 132 is located in the display region 1311, and the receiver 162 is configured to receive the infrared light through the display region 1311. In this way, there is sufficient space to arrange the receiver 162. Certainly, in some embodiments, the orthographic projection of the receiver 162 on the lower surface 132 may also located at a position corresponding to the non-display region 1312, as illustrated in FIG. 6.

As illustrated in FIG. 3, in some embodiments, the electronic device 10 further includes a touch layer 12 and a coverplate 11. The coverplate 11 is disposed on the touch layer 12, the touch layer 12 is disposed on the display screen 13, and the upper surface 131 of the display screen faces the touch layer 12. Light transmittances of the touch layer 12 and the coverplate 11 to the visible light and the infrared light are both greater than 90%.

Specifically, the touch layer 12 is mainly configured to receive an input signal generated when the user touches the touch layer 12 and transmit the input signal to the circuit board for data processing, so as to obtain a specific position of the touch layer 12 touched by the user. The touch layer 12 may be attached to the display screen 13 by an In-Cell or On-Cell attaching technology, which may effectively reduce the weight and the overall thickness of the display screen. In addition, providing the coverplate 11 on the touch layer 12 may effectively protect the touch layer 12 and its internal structure and avoid external forces to damage the touch layer 12 and the display screen 13. The light transmittances of the coverplate 11 and the touch layer 12 to the visible light and the infrared light are both greater than 90%, which is not only beneficial for the display screen 13 to better display contents, but also beneficial for the infrared sensor 16 disposed below the display screen 13 to stably emit and receive the infrared light, thereby ensuring the normal operation of the infrared sensor 16.

In some embodiments, the display screen 13 is configured to luminesce and display contents through the display region 1311. A ratio of an area of the display region 1311 to an area of the coverplate 11 is greater than 90%. For example, the ratio of the area of the display region 1311 to the area of the coverplate 11 is 95% or 96%.

Specifically, by setting the ratio of the area of the display region 1311 to the area of the coverplate 11, the display region 1311 is able to display the contents with a larger area after the coverplate 11 is attached, which not only improves the user experience, but also effectively increases the screen-to-body ratio of the electronic device 10, so as to realize the full screen effect. The non-display region 1312 may also be used to shield other elements and metal lines under the display screen 13, so as to keep the appearance of the product consistent. The non-display region 1312 may increase an optical density of the display screen 13 by printing ink, which not only ensures the shading effect, but also creates a good visual effect.

As illustrated in FIG. 3, in some embodiments, the electronic device 10 further includes a first coating layer 14 coated on the lower surface 132 of the display screen 13 and covering the transmitter 161. The first coating layer 14 is configured to transmit infrared light and block visible light, and the transmitter 161 is configured to emit the infrared light through the first coating layer 14.

Specifically, in the assembly process, it usually needs to reserve an assembly gap for the installation of the transmitter 161, which results in a gap between the transmitter 161 and other elements, so that the visible light may enter from the gap and light leakage occurs. For this, in a stack direction of the transmitter 161 and the display screen 13, an area of an orthographic projection of the first coating layer 14 on the lower surface 132 covers an area of the orthographic projection of the transmitter 161 on the lower surface 132, which enables the first coating layer 14 to sufficiently shield the transmitter 161 without affecting the normal operation of the transmitter 161, so that the transmitter 161 is invisible when viewing the electronic device 10 from the outside.

The first coating layer 14 transmits the infrared light, so that when the transmitter 161 emits the infrared light outward for detection, an intensity of the infrared light passing through the first coating layer 14 is attenuated less, or a degree of attenuation does not affect the detection process, thereby ensuring the normal operation of the transmitter 161. The first coating layer 14 blocks the visible light, so that the visible light cannot pass through the first coating layer 14, and the transmitter 161 is shielded visually, thereby achieving the effect that the transmitter 161 is invisible when viewing the electronic device 10 from the outside.

In some embodiments, the infrared sensor 16 includes a proximity sensor, the transmitter 161 is configured to emit the infrared light through the first coating layer 14 and the non-display region 1312, and the receiver 162 is configured to receive the infrared light reflected by an object to detect a distance between the object and the upper surface 131 of the display screen.

Specifically, in an example, when the user is receiving or making a call, the electronic device 10 is close to the head, the transmitter 161 emits the infrared light, and the receiver 162 receives the infrared light reflected by the head. The processor calculates the time of the infrared light from emission to reflection back, and issues a corresponding instruction to control the screen to turn off background lights. When the electronic device 10 is away from the head, the processor calculates the feedback data again and issues an instruction to turn on the background lights of the screen. In this way, not only a misoperation of the user is prevented, but also the power of the mobile phone is saved.

In some embodiments, the first coating layer 14 includes an IR ink, and the IR ink has a light transmittance of greater than 85% to infrared light having a wavelength ranging from 850 nm to 940 nm and a light transmittance of lower than 6% to visible light.

Specifically, since the IR ink has the characteristic of low transmittance to the visible light, when viewing the electronic device 10 from the outside, the transmitter 161 disposed below the first coating layer 14 is unobservable based on human eyes. At the same time, the IR ink has the characteristics of high transmittance to the infrared light, which enables the transmitter 161 to emit the infrared light stably, thereby ensuring the normal operation of the transmitter 161.

As illustrated in FIG. 6, in some embodiments, the transmitter 161 and the receiver 162 are in a split structure.

Specifically, since the transmitter 161 and the receiver 162 are in the split structure, the transmitter 161 and the receiver 162 may be arranged compactly or dispersedly, which is not only conducive for the electronic device 10 to fully allocate spatial positions of individual elements and apply the transmitter 161 and the receiver 162 of various shapes, but also conducive for the transmitter 161 and the receiver 162 to provide possible positions for other elements in the electronic device 10.

In an example, the split transmitter 161 and receiver 162 are both disposed below a length edge of the non-display region 1312, as illustrated in FIG. 6.

Figure 7:
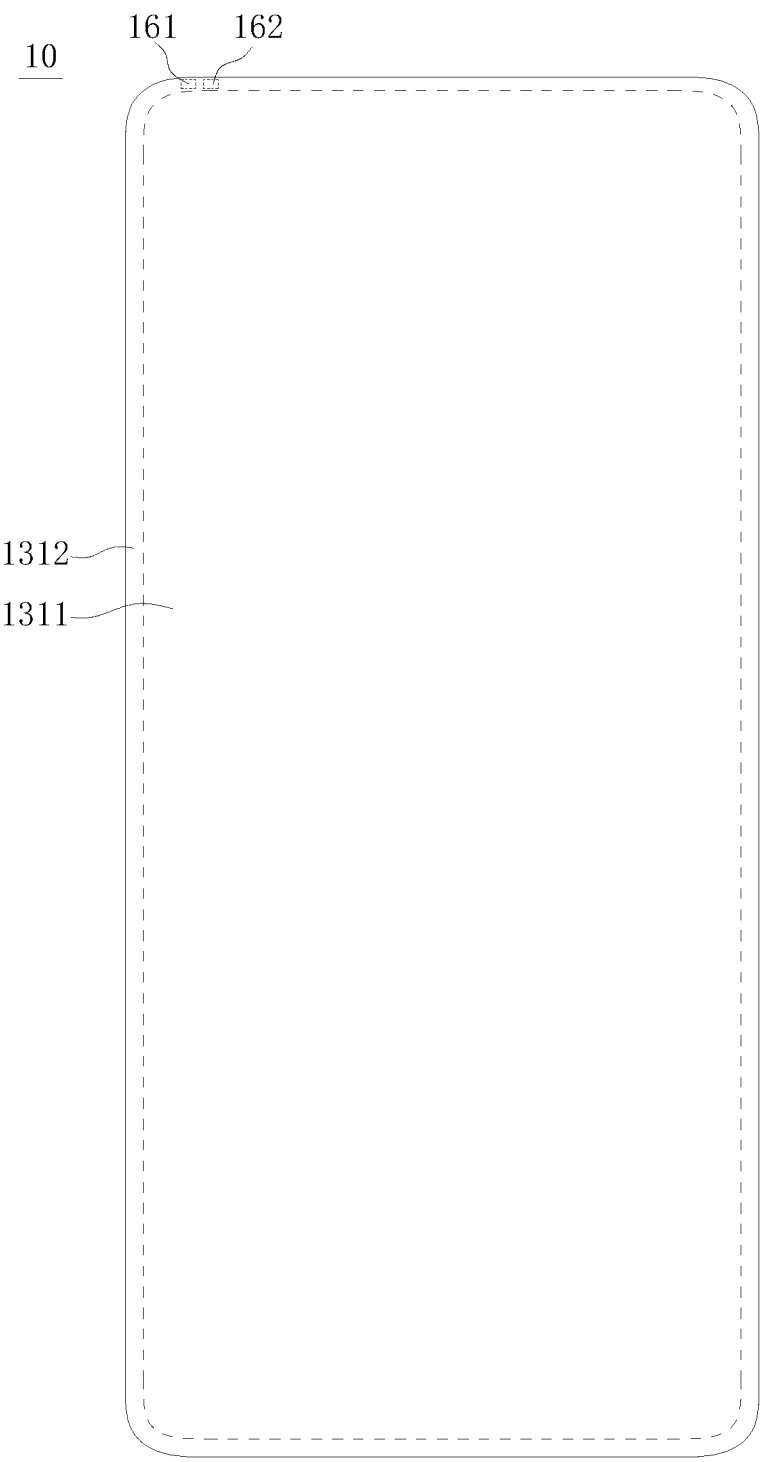
FIG. 7 is a schematic plan view of an electronic device according to another embodiment of the present disclosure.

In another example, the split transmitter 161 and receiver 162 are both disposed below a position corresponding to a corner of the non-display region 1312, as illustrated in FIG. 7.

Figure 8:
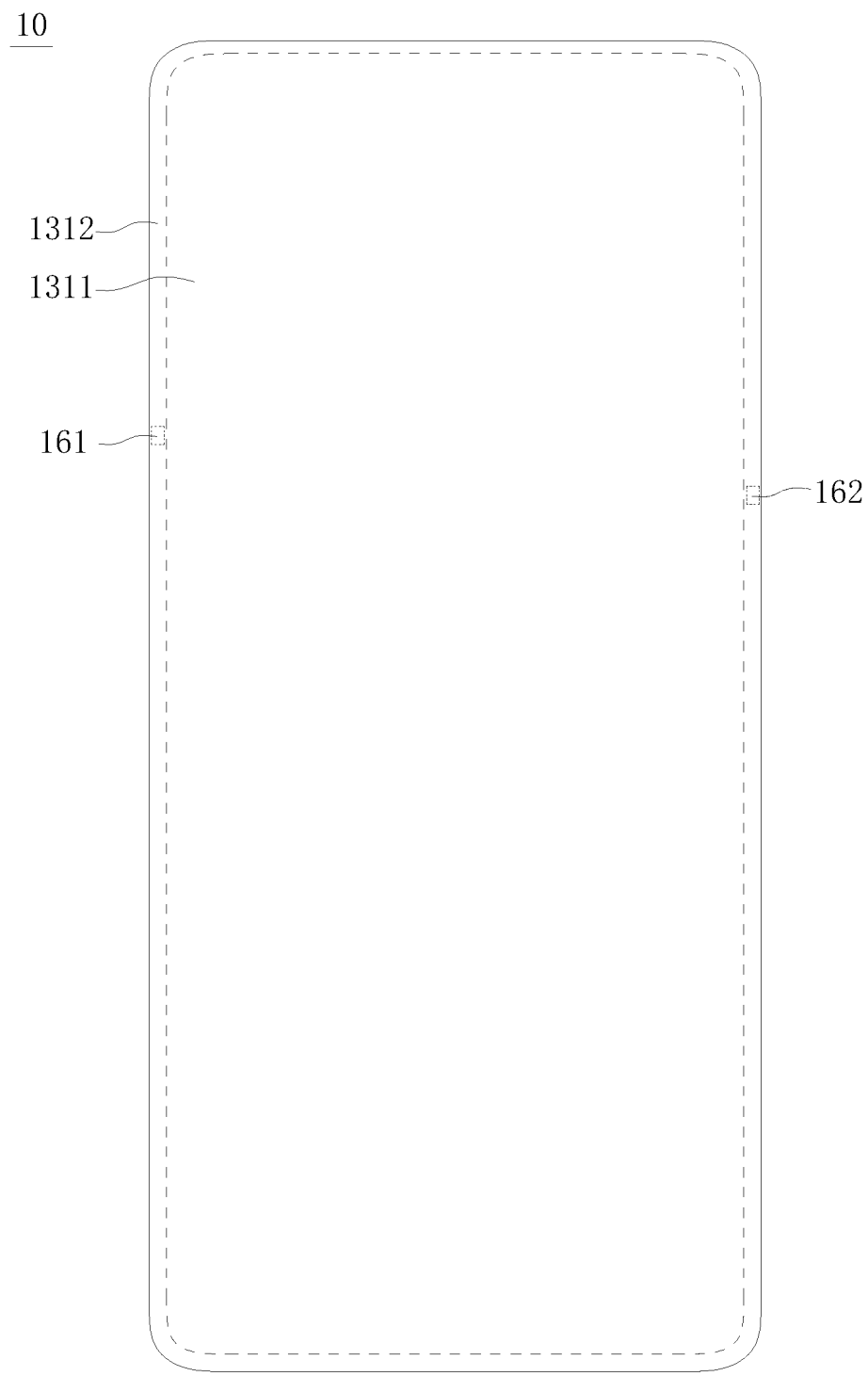
FIG. 8 is a schematic plan view of an electronic device according to yet another embodiment of the present disclosure.

In yet another example, the split transmitter 161 and receiver 162 are disposed below two length edges of the non-display region 1312, respectively, as illustrated in FIG. 8.

Figure 9:
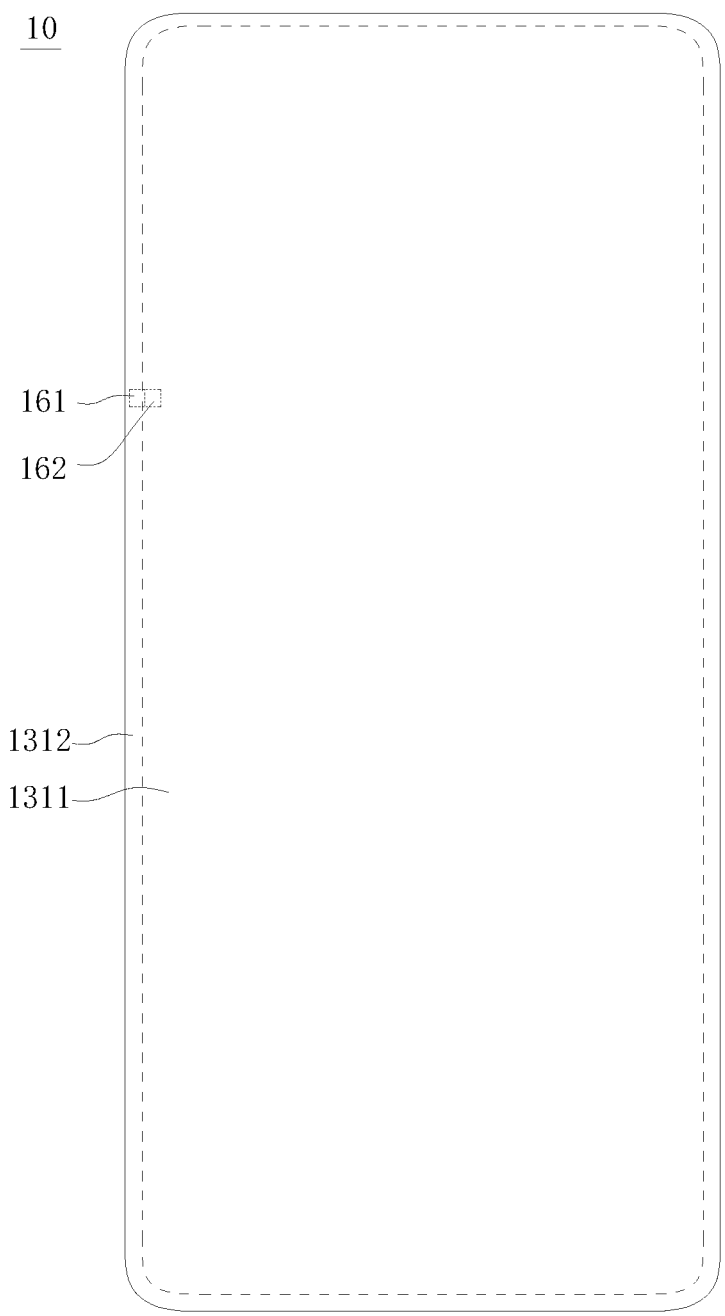
FIG. 9 is a schematic plan view of an electronic device according to yet another embodiment of the present disclosure.

As illustrated in FIG. 9, in some embodiments, the transmitter 161 and the receiver 162 are in an integral structure.

Specifically, the transmitter 161 and the receiver 162 are in the integral structure, so that line connections between the split structures are omitted, which is beneficial to reduce the line process flow, improve the production efficiency of the product, and reduce the production cost.

In an example as illustrated in FIG. 9, in the infrared sensor 16, the transmitter 161 is located at a position corresponding to the non-display region 1312, and the receiver 162 is located at a position corresponding to the display region 1311.

Figure 10:
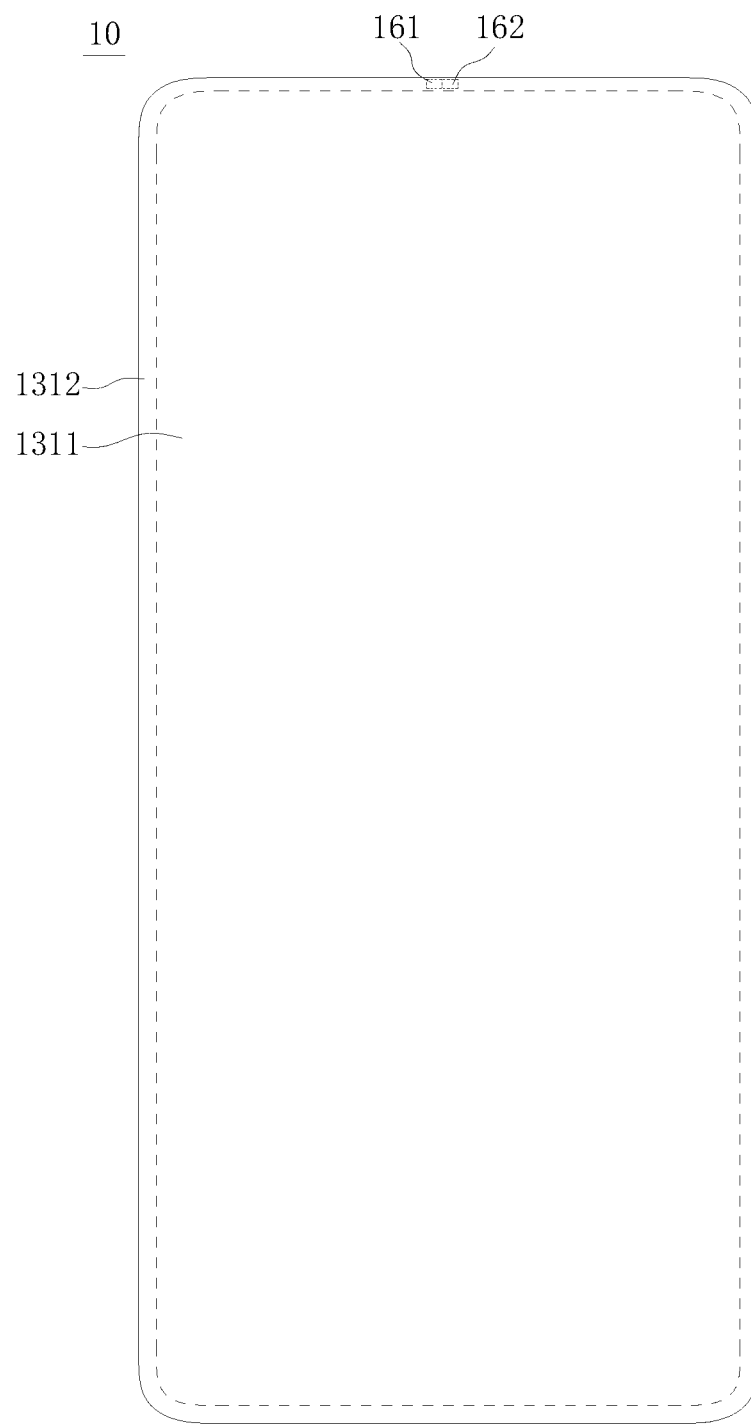
FIG. 10 is a schematic plan view of an electronic device according to yet another embodiment of the present disclosure.

In an example as illustrated in FIG. 10, the transmitter 161 and the receiver 162 in the integral structure are both disposed at a position corresponding to a width edge of the non-display region 1312.

As illustrated in FIG. 3, in some embodiments, the electronic device 10 further includes a second coating layer 15 coated on the lower surface 132 of the display screen 13 and covering the receiver 162. The second coating layer 15 is configured to transmit infrared light and block visible light, and the receiver 162 is configured to receive infrared light through the display region 1311 and the second coating layer 15.

Specifically, in the assembly process, it usually needs to reserve an assembly gap for the installation of the receiver 162, which results in a gap between the receiver 162 and other elements, so that the visible light may enter from the gap and light leakage occurs. For this, in a stack direction of the receiver 162 and the display screen 13, an area of an orthographic projection of the second coating layer 15 on the lower surface 132 covers an area of the orthographic projection of the receiver 162 on the lower surface 132, which enables the second coating layer 15 to sufficiently shield the receiver 162 without affecting the normal operation of the receiver 162, so that the receiver 162 is invisible when viewing the electronic device 10 from the outside.

The second coating layer 15 may also use the IR ink. Since the IR ink has the characteristic of low transmittance to the visible light, when viewing the electronic device 10 from the outside, the receiver 162 disposed below the second coating layer 15 is unobservable based on human eyes. At the same time, the IR ink has the characteristics of high transmittance to the infrared light, which enables the receiver 162 to receive the infrared light stably, thereby ensuring the normal operation of the receiver 162.

In some embodiments, the electronic device 10 further includes a buffer layer 18 covering the lower surface 132 of the display screen 13 and avoiding the infrared sensor 16.

Specifically, the buffer layer 18 is configured to reduce an impact force and resist shocks so as to protect the touch layer 12 and the display screen 13 as well as their internal structures, and to prevent the display screen from being damaged by external impact. The buffer layer 18 may be made of foam, a foamed plastic, a rubber or other soft materials. It should be understood that, these buffer materials are only illustrated as examples, and embodiments of the present disclosure are not limited thereto. In addition, in the process of providing the buffer layer 18, the purpose of avoiding the infrared sensor 16 is to prevent the buffer layer 18 from blocking the signal reception of the infrared sensor 16, so as to prevent the infrared sensor 16 from being affected in the process of receiving the infrared light.

In some embodiments, the electronic device 10 further includes a metal sheet 19 covering the buffer layer 18 and avoiding the infrared sensor 16.

Specifically, the metal sheet 19 is configured to shield electromagnetic interference and is grounded, and has the function of heat dissipation to reduce the temperature rise. The metal sheet 19 may be formed by tailoring metal materials, such as copper foil and aluminum foil. It should be understood that, these metal materials are only illustrated as examples, and embodiments of the present disclosure are not limited thereto. In addition, in the process of providing the metal sheet 19, the purpose of avoiding the infrared sensor 16 is to prevent the metal sheet 19 from blocking the signal reception of the infrared sensor 16, so as to prevent the infrared sensor 16 from being affected in the process of receiving the infrared light.

Figure 11:
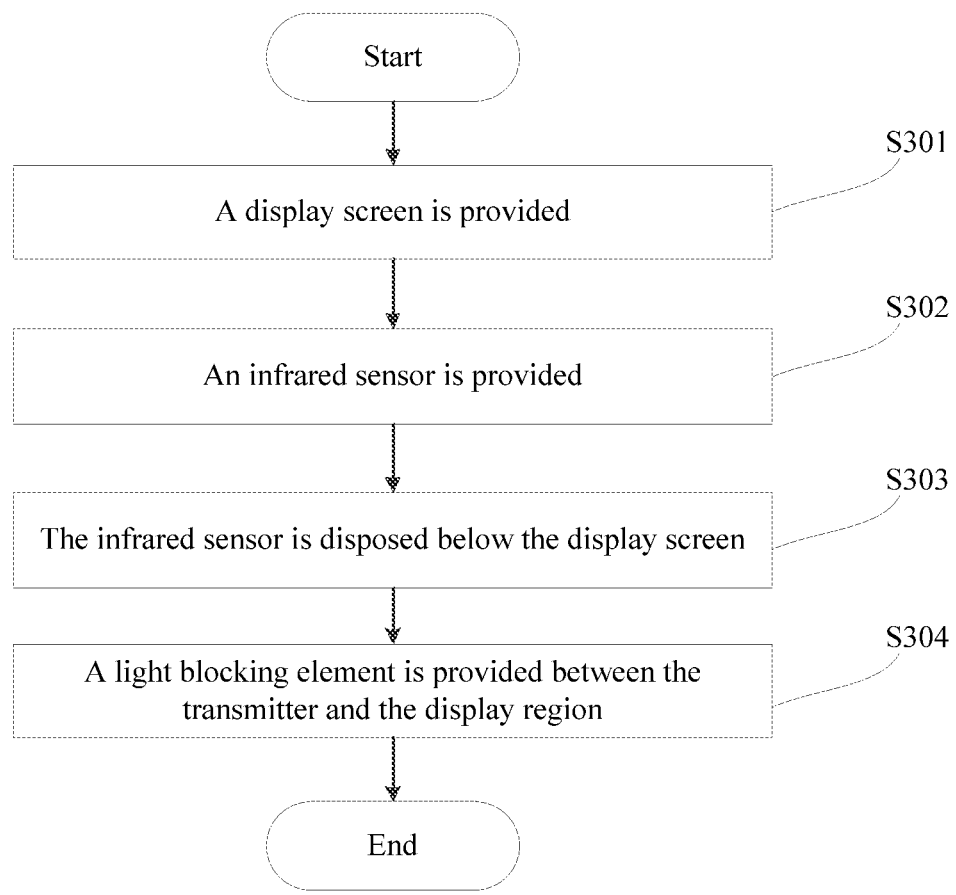
FIG. 11 is a flowchart of a method for producing an electronic device according to an embodiment of the present disclosure.

As illustrated in FIG. 3 and FIG. 11, embodiments of the present disclosure provide a method for producing an electronic device 10, which includes the following steps.

At D301, a display screen 13 is provided. The display screen 13 includes a display region 1311 and a non-display region 1312.

At S302, an infrared sensor 16 is provided. The infrared sensor includes a transmitter 161 configured to emit infrared light and a receiver 162 configured to receive the infrared light.

At S303, the infrared sensor 16 is disposed below the display screen 13, so that the transmitter 161 is located below the non-display region 1312.

At S304, a light blocking element 30 is provided between the transmitter 161 and the display region 1311. The light blocking element 30 is configured to prevent the infrared light emitted by the transmitter 161 from entering the display region 1311.

Specifically, the electronic device 10 adopts the display screen 13, and the infrared sensor 16 may be disposed below the display screen 13 in the case of a full screen. Moreover, setting the transmitter 161 of the infrared sensor 16 below the non-display region 1312 may prevent the infrared light emitted by the transmitter 161 from affecting the working stability of the TFT in the display region 1311, so that the display screen 13 and the infrared sensor 16 may realize their respective functions without interfering with each other. The display screen 13 may be an OLED display screen, which has good light transmittance and is able to transmit visible light and infrared light. Therefore, the OLED display screen does not affect the infrared sensor to emit and receive the infrared light when displaying contents. The display screen 13 may also apply a micro LED display screen, which also has good light transmittances to the visible light and the infrared light. It should be understood that, these display screens are only illustrated as examples, and embodiments of the present disclosure are not limited thereto. In addition, the upper surface 131 of the display screen 13 is configured to transmit the visible light to display contents on the one hand, and to transmit the infrared light to enable the infrared sensor 16 to normally emit and receive the infrared light on the other hand.

In some embodiments, the method for producing an electronic device 10 further includes providing a touch layer 12 on the display screen 13, and providing a coverplate 11 on the touch layer 12.

Specifically, the touch layer 12 is mainly configured to receive an input signal generated when a user touches the touch layer 12 and transmit the input signal to a circuit board for data processing, so as to obtain a specific position of the touch layer 12 touched by the user. The touch layer 12 may be attached to the display screen 13 by an In-Cell or On-Cell attaching technology, which may effectively reduce the weight and the overall thickness of the display screen. In addition, providing the coverplate 11 on the touch layer 12 may protect the touch layer 12 and its internal structure and avoid external forces to directly damage the touch layer 12.

In some embodiments, before the step S303, the method for producing an electronic device 10 further includes: coating a first coating layer 14 on a lower surface 132 of the display screen; and the step S303 specifically includes: providing below the display screen 13 the infrared sensor 16 and covering the transmitter 161 by the first coating layer 14, so that the transmitter 161 is configured to emit the infrared light through the first coating layer 14.

Specifically, the first coating layer 14 may use the IR ink. Since the IR ink has the characteristic of low transmittance to the visible light, when viewing the electronic device 10 from the outside, the transmitter 161 disposed below the first coating layer 14 is unobservable based on human eyes. At the same time, the IR ink has the characteristics of high transmittance to the infrared light, which enables the transmitter 161 to emit infrared light stably, thereby ensuring the normal operation of transmitter 161.

Reference throughout this specification to "an embodiment," "some embodiments," "example embodiment", "an example," "a specific example," or "some examples," means that a particular feature, structure, material, or characteristic described in connection with the embodiment or example is included in at least one embodiment or example of the present disclosure. Thus, the appearances of the phrases such as "in an embodiment," "in some embodiments," "in an example embodiment", "in an example," "in a specific example," or "in some examples," in various places throughout this specification are not necessarily referring to the same embodiment or example of the present disclosure. Furthermore, the described particular features, structures, materials, or characteristics may be combined in any suitable manner in one or more embodiments or examples.

Although embodiments of the present disclosure have been shown and described, it would be appreciated by those skilled in the art that changes, modifications, alternatives and variant can be made in the embodiments without departing from spirit and principles of the present disclosure, and the scope of the present disclosure is defined by the claims and their equivalents.

What is claimed is:

1. An electronic device, comprising:
   a display screen, comprising a display region and a non-display region;
   an infrared sensor, comprising:
     a transmitter, located below the non-display region and configured to emit infrared light; and
     a receiver, configured to receive the infrared light;
   a light blocking element, disposed between the transmitter and the display region and configured to prevent the infrared light emitted by the transmitter from entering the display region; and
   a first coating layer, coated on a lower surface of the display screen and covering the transmitter, wherein the first coating layer is configured to transmit infrared light and block visible light, wherein the transmitter is configured to emit the infrared light through the first coating layer, wherein the first coating layer comprises an IR ink, and wherein the IR ink has a light transmittance of greater than 85% to infrared light having a wavelength ranging from 850 nm to 940 nm and a light transmittance of lower than 6% to visible light.

* * * * *